(12) United States Patent
Ha

(10) Patent No.: US 12,125,153 B2
(45) Date of Patent: Oct. 22, 2024

(54) AUGMENTED REALITY OPTICAL DEVICE HAVING GHOST IMAGE BLOCKING FUNCTION

(71) Applicant: LETINAR CO., LTD, Anyang-si (KR)

(72) Inventor: Jeong Hun Ha, Seoul (KR)

(73) Assignee: LETINAR CO., LTD, Anyang-si (KR)

( * ) Notice: Subject to any disclaimer, the term of this patent is extended or adjusted under 35 U.S.C. 154(b) by 0 days.

(21) Appl. No.: 17/768,252

(22) PCT Filed: Oct. 22, 2020

(86) PCT No.: PCT/KR2020/014480
§ 371 (c)(1),
(2) Date: Apr. 12, 2022

(87) PCT Pub. No.: WO2021/080342
PCT Pub. Date: Apr. 29, 2021

(65) Prior Publication Data
US 2024/0119677 A1 Apr. 11, 2024

(30) Foreign Application Priority Data
Oct. 24, 2019 (KR) .................... 10-2019-0132973

(51) Int. Cl.
*G06T 19/00* (2011.01)
*G02B 27/01* (2006.01)

(52) U.S. Cl.
CPC ........ *G06T 19/006* (2013.01); *G02B 27/0172* (2013.01); *G02B 2027/0178* (2013.01)

(58) Field of Classification Search
CPC ....... G06T 19/006; G06T 11/00; G06T 11/60; G06T 15/00
See application file for complete search history.

(56) References Cited

U.S. PATENT DOCUMENTS

| 2010/0177163 A1* | 7/2010 | Yang | G06T 15/503 |
| | | | 348/E13.001 |
| 2012/0120498 A1* | 5/2012 | Harrison | G02B 3/08 |
| | | | 359/630 |

(Continued)

FOREIGN PATENT DOCUMENTS

| CN | 108681068 A | 10/2018 |
| CN | 113396356 A | 9/2021 |

(Continued)

*Primary Examiner* — Ming Wu
(74) *Attorney, Agent, or Firm* — Rabin & Berdo, P.C.

(57) ABSTRACT

The present invention provides an optical device for augmented reality having a ghost image blocking function. The optical device includes: an optical means configured to transmit at least part of real object image light, which is image light output from a real object, therethrough toward the pupil of an eye of a user; a first reflective unit disposed inside the optical means, and configured to transfer augmented reality image light, which is image light corresponding to an image for augmented reality output from an image output unit, to a second reflective unit; and the second reflective unit disposed inside the optical means, and configured to transfer the augmented reality image light to the pupil of the eye of the user by reflecting the augmented reality image light to the pupil of the eye of the user, thereby providing the image for augmented reality to the user.

23 Claims, 8 Drawing Sheets

(56) References Cited

U.S. PATENT DOCUMENTS

| | | | |
|---|---|---|---|
| 2012/0299950 A1* | 11/2012 | Ali | G06T 19/006 |
| | | | 345/592 |
| 2014/0293434 A1* | 10/2014 | Cheng | H04N 13/363 |
| | | | 359/630 |
| 2019/0204601 A1 | 7/2019 | Ha et al. | |
| 2019/0250400 A1 | 8/2019 | Ricks et al. | |

FOREIGN PATENT DOCUMENTS

| | | |
|---|---|---|
| JP | H11-142783 A | 5/1999 |
| KR | 10-2006-0014382 A | 2/2006 |
| KR | 10-2014-0031321 A | 3/2014 |
| KR | 10-1660519 B1 | 9/2016 |
| KR | 10-2018-0028339 A | 3/2018 |
| KR | 10-2019-0084066 A | 7/2019 |

\* cited by examiner

AUGMENTED REALITY OPTICAL DEVICE HAVING GHOST IMAGE BLOCKING FUNCTION

TECHNICAL FIELD

The present invention relates to an optical device for augmented reality, and more particularly to an optical device for augmented reality having a ghost image blocking function, which is capable of significantly reducing the size, thickness, weight, and volume thereof and also providing a clearer image for augmented reality by effectively blocking a ghost image.

BACKGROUND ART

Augmented Reality (AR) refers to technology that superimposes a virtual image, provided by a computer or the like, on a real image of the real world and then provides a resulting image, as is well known.

In order to implement augmented reality, there is required an optical system that allows a virtual image, generated by a device such as a computer, to be superimposed on an image of the real world and then allows a resulting image to be provided. As such an optical system, there is known a technology using an optical means such as a prism for reflecting or refracting a virtual image by using a head-mounted display (HMD) or a glasses-type device.

However, devices using the conventional optical system have problems in that it is inconvenient for users to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies such as a prism capable of adjusting focal length for a virtual image and a method for electrically controlling a variable focal lens in response to a change in focal length. However, these technologies also have a problem in that a user needs to perform a separate operation in order to adjust focal length or in that hardware such as a separate processor and software for controlling focal length are required.

In order to overcome the problems of the conventional technologies, the present applicant has developed an optical device capable of implementing augmented reality by projecting a virtual image onto the retina through the pupil using a reflective unit having a size smaller than that of a human pupil, as described in patent document 1.

FIG. 1 is a diagram showing an optical device 100 for augmented reality disclosed in patent document 1.

The optical device 100 for augmented reality, which is shown in FIG. 1, includes an optical means 10, a reflective unit 30, an image output unit 40, and a frame unit 60.

The optical means 10 is a means for transmitting at least part of real object image light, which is image light output from a real object, therethrough, and may be, e.g., a lens of eyeglasses. The reflective unit 30 is embedded inside the optical means 10. Furthermore, the optical means 10 also functions to transmit the augmented reality image light, reflected by the reflective unit 30, therethrough in order to transfer the augmented reality image light to the pupil.

The frame unit 60 is a means for fixing and supporting both the image output unit 40 and the optical means 10, and may be, e.g., an eyeglass frame.

The image output unit 40 is a means for outputting augmented reality image light, which is image light corresponding to an image for augmented reality. For example, the image output unit 40 may include a small display device configured to display an image for augmented reality on a screen and to radiate augmented reality image light, and a collimator configured to collimate the image light, radiated from the display device, into parallel light.

The reflective unit 30 reflects image light corresponding to an image for augmented reality, output from the image output unit 40, toward a pupil of a user, thereby providing the image for augmented reality.

The reflective unit 30 shown in FIG. 1 is formed to have a size equal to or smaller than that of the average pupil of people, i.e., 8 mm or less. By forming the reflective unit 30 to be smaller than the average pupil of people as described above, the depth of field for light entering the pupil through the reflective unit 30 may be made almost infinite, i.e., considerably deep. Here, the depth of field refers to a range within which an image for augmented reality is recognized as being in focus. When the depth of field increases, a focal distance for an image for augmented reality increases. Accordingly, even when a user changes the focal distance for the real world while gazing at the real world, an image for augmented reality is always recognized as being in focus regardless of such a change. This may be viewed as a type of pinhole effect. Accordingly, a clear virtual image may always be provided for an image for augmented reality regardless of the fact that a user changes the focal distance while gazing at a real object in the real world.

However, this technology has a limitation in that the size, thickness, and volume of the device increase because an additional optical means such as a collimator for parallel light is required for the image output unit 40.

In order to overcome this problem, there may be contemplated a method of performing the function of a collimator by embedding and arranging a reflective unit, such as a concave mirror, inside the optical means 10 without using a collimator in the image output unit 40. According to this configuration, there is an advantage in that the size, thickness and, volume of the image output unit 40 can be reduced.

FIG. 2 shows a comparison between a side view of the optical device 100 for augmented reality of FIG. 1 in which the image output unit 40 is provided with a collimator and a side view of an optical device 100-1 for augmented reality in which an auxiliary reflective unit 20 functioning as a collimator is disposed.

It can be seen that in the optical device 100 for augmented reality of FIG. 1 shown on the left side of FIG. 2, the image output unit 40 includes a display device 41 and a collimator 42, whereas in the optical device 100-1 for augmented reality shown on the right side of FIG. 2, an image output unit 40 includes only a display device 41 without a collimator.

In the optical device 100-1 for augmented reality shown on the right side of FIG. 2, the configuration of disposing a concave mirror-type auxiliary reflective unit 20 capable of functioning as a collimator inside an optical means 10 is employed instead of the configuration of using the collimator 42 in the image output unit 40. The augmented reality image light output from the image output unit 40 is reflected by the auxiliary reflective unit 20 and then transferred to a reflective unit 30, and the reflective unit 30 transfers the augmented reality image light to the pupil.

As described above, the optical device 100-1 for augmented reality shown on the right side of FIG. 2 has the advantage of performing the same function as the optical device 100 for augmented reality shown in FIG. 1 and also significantly reducing form factors, such as size, volume, thickness, and weight, compared to the optical device 100 for augmented reality using an external collimator as shown on the left side of FIG. 2 because it does not use a component, such as a collimator, in the image output unit 40

However, the optical device 100-1 for augmented reality shown on the right side of FIG. 2 has a problem in that unintended real object image light that generates a ghost image may be transferred to the pupil.

FIG. 3 is a diagram illustrating the principle by which a ghost image is generated in the optical device 100-1 for augmented reality.

Referring to FIG. 3, the real object image light, which is image light from a real object, is directly transferred to the pupil through the optical means 10, and there is present the stray light reflected by the auxiliary reflective unit 20 and transferred to the pupil. The real object image light transferred to the pupil by the stray light forms an image at a location different from that of the real object image light transferred directly to the pupil through the optical means 10, thereby generating a ghost image.

Therefore, there is a demand for technology that is capable of solving the problem of a ghost image that may be generated in the optical device 100-1 for augmented reality using an embedded collimator such as the auxiliary reflective unit 20 in order to reduce form factors, as shown in FIG. 2.

PRIOR ART LITERATURE

Korean Patent No. 10-1660519 (published on Sep. 29, 2016)

DISCLOSURE

Technical Problem

The present invention has been conceived to overcome the above-described problems, and an object of the present invention is to provide an optical device for augmented reality, which is capable of significantly reducing the size, thickness, weight, and volume thereof and also effectively blocking a ghost image.

Another object of the present invention is to provide an optical device for augmented reality, which is capable of minimizing the leakage of image light of the real world, which may generate a ghost image, to the pupil of a user, thereby maximizing a see-through property and also providing a clear virtual image.

Another object of the present invention is to provide an apparatus for providing augmented reality in the form of glasses that is capable of significantly reducing the size, thickness, weight and volume thereof while blocking the occurrence of a ghost image, thereby enabling a person to wear the apparatus without discomfort.

Technical Solution

In order to accomplish the above objects, the present invention provides an optical device for augmented reality having a ghost image blocking function, the optical device including: an optical means configured to transmit at least part of real object image light, which is image light output from a real object, therethrough toward the pupil of an eye of a user; a first reflective unit disposed inside the optical means, and configured to transfer augmented reality image light, which is image light corresponding to an image for augmented reality output from an image output unit, to a second reflective unit; and the second reflective unit disposed inside the optical means, and configured to transfer the augmented reality image light, transferred from the first reflective unit, to the pupil of the eye of the user by reflecting the augmented reality image light to the pupil of the eye of the user, thereby providing the image for augmented reality to the user; wherein the optical means has a first surface which the real object image light enters, and a second surface through which the augmented reality image light, transferred via the second reflective unit, and the real object image light are output toward the pupil of the eye of the user; wherein the augmented reality image light output from the image output unit is transferred to the first reflective unit through the inner part of the optical means, or is reflected by total internal reflection on an inner surface of the optical means and transferred to the first reflective unit; and wherein a reflective surface of the first reflective unit which reflects the augmented reality image light is disposed to face the direction in which the augmented real image light enters.

In this case, the first reflective unit may be disposed inside the optical means to be opposite to the image output unit with the second reflective unit interposed therebetween and to face the first surface of the optical means.

Furthermore, the reflective surface of the first reflective unit may be formed as a curved surface.

Furthermore, the reflective surface of the first reflective unit may be formed to be concave toward the direction in which the augmented real image light enters.

Furthermore, the length of the first reflective unit in the widthwise direction thereof may be 4 mm or less.

Furthermore, the first reflective unit may be formed of a half mirror configured to partially reflect light or a notch filter configured to selectively transmit light according to the wavelength of the light.

Furthermore, the first reflective unit may be formed of a refractive or diffractive element.

Furthermore, the surface of the first reflective unit opposite to the surface thereof that reflects the augmented reality image light may be coated with a material that absorbs light without reflecting light.

Furthermore, the second reflective unit may be disposed to have an inclination angle with respect to the second surface of the optical means in order to transfer the augmented reality image light, transferred from the first reflective unit, to the pupil by reflecting the augmented reality image light toward the pupil.

Furthermore, the second reflective unit may be formed to have a size of 4 mm or less.

Furthermore, the size of the second reflective unit may be a maximum length between any two points on the edge boundary of the second reflective unit.

Furthermore, the size of the second reflective unit may be a maximum length between any two points on the edge boundary of an orthographic projection obtained by projecting the second reflective unit onto a plane including the center of the pupil while being perpendicular to a straight line between the pupil of the user and the second reflective unit.

Furthermore, the second reflective unit may comprise a plurality of the second reflective units, and each of the second reflective units may be disposed such that the augmented reality image light transferred from the first reflective unit is not blocked by remaining second reflective units.

Furthermore, the sizes of the plurality of the second reflective units may be partially different from each other.

Furthermore, an interval between at least some of the plurality of the second reflective units may be different from an interval between remaining second reflective units.

Furthermore, at least some of the plurality of the second reflective units may be each formed of a half mirror configured to partially reflect light or a notch filter configured to selectively transmit light according to a wavelength of the light.

Furthermore, at least some of the plurality of the second reflective units may be each formed of a refractive or diffractive element.

Furthermore, for at least some of the plurality of the second reflective units, a surface thereof opposite to a surface thereof that reflects the augmented reality image light may be coated with a material that absorbs light without reflecting light.

Furthermore, the surfaces of at least some of the plurality of the second reflective units may be formed as curved surfaces.

According to another aspect of the present invention, there is provided an apparatus for providing augmented reality in the form of glasses, the apparatus including lens units configured to transmit at least part of image light output from a real object therethrough toward the pupil of an eye of a user and a frame unit configured to fix the lens units, wherein each of the lens units is the above-described optical device having a ghost image blocking function.

In this case, a lens having a refractive power for vision correction may be disposed on at least one of the outer and inner sides of the lens unit.

Furthermore, all or part of the lens unit may be formed of a vision correction lens having a refractive power for vision correction.

Advantageous Effects

According to the present invention, there is provided the optical device for augmented reality, which is capable of significantly reducing the size, thickness, weight, and volume thereof and also effectively blocking a ghost image.

Furthermore, according to the present invention, there is provided the optical device for augmented reality, which is capable of minimizing the leakage of image light of the real world, which may generate a ghost image, to the pupil of a user, thereby maximizing a see-through property and also providing a clear virtual image.

Furthermore, according to the present invention, there is provided the apparatus for providing augmented reality in the form of glasses that is capable of significantly reducing the size, thickness, weight and volume thereof while blocking the occurrence of a ghost image, thereby enabling a person to wear the apparatus without discomfort.

DESCRIPTION OF DRAWINGS

FIGS. 4 to 6 are diagrams illustrating the configuration of an optical device (200) for augmented reality having a ghost image blocking function according to an embodiment of the present invention, wherein FIG. 4 is a side view of the optical device (200) for augmented reality, FIG. 5 is a front view of the optical device (200) for augmented reality, and FIG. 6 is a perspective view of the optical device (200) for augmented reality;

BEST MODE

Embodiments of the present invention will be described in detail below with reference to the accompanying drawings.

Figure 1:
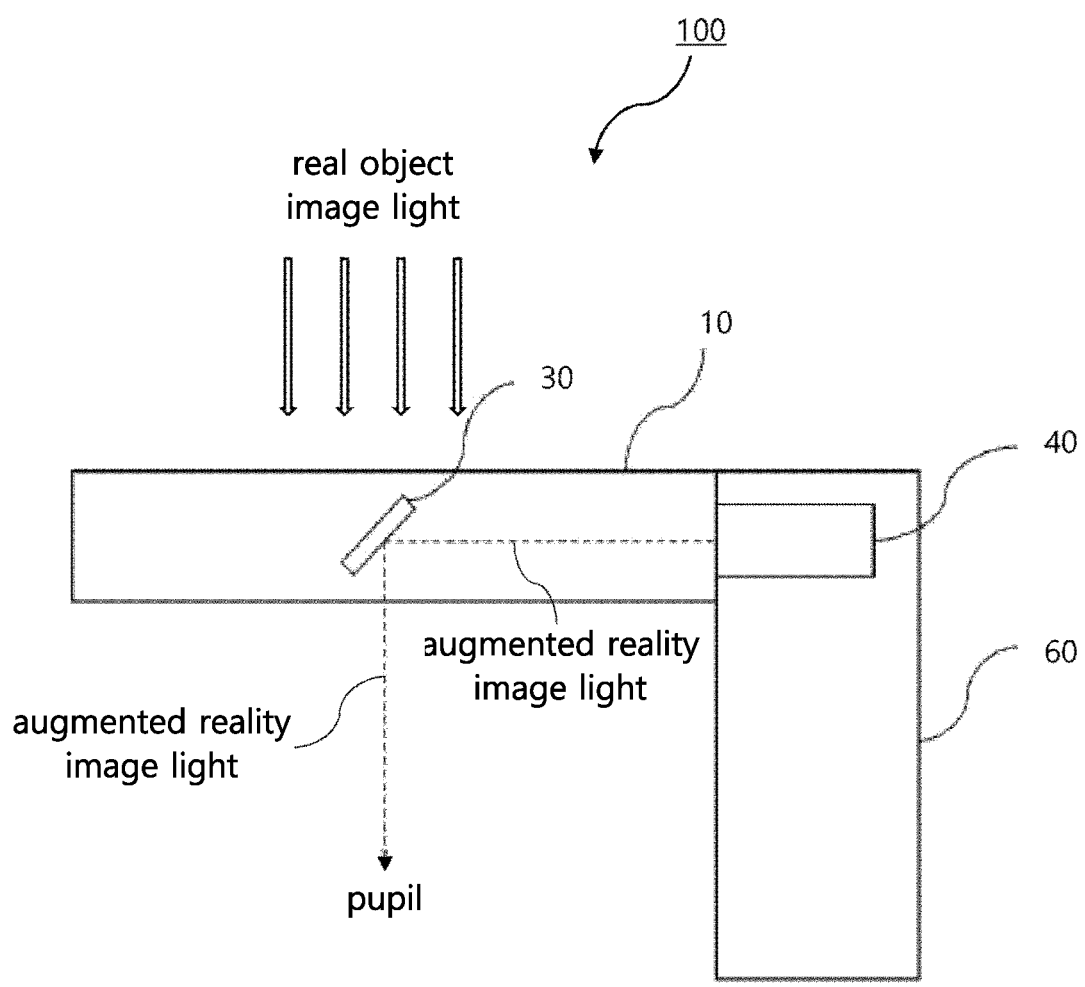
FIG. 1 is a diagram showing an optical device (100) for augmented reality disclosed in patent document 1.
Figure 2:
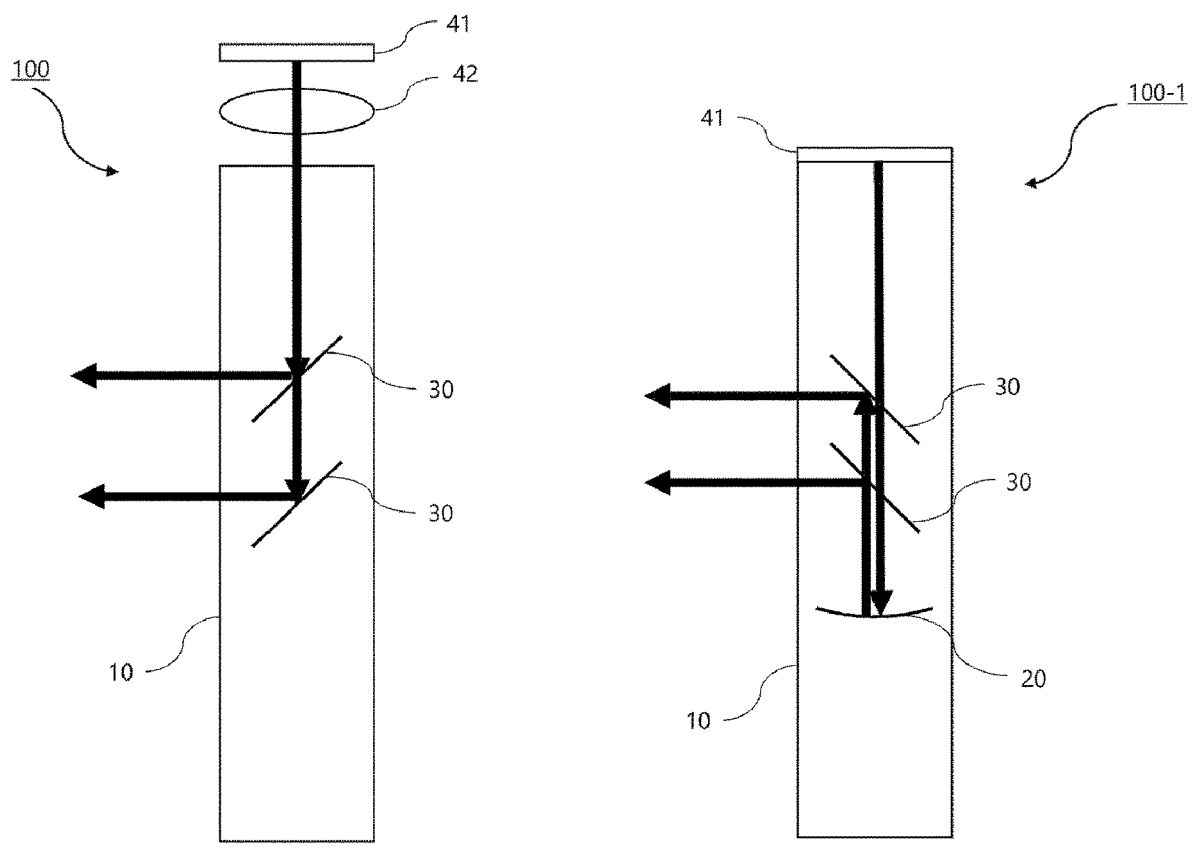
FIG. 2 shows a comparison between a side view of the optical device (100) for augmented reality of FIG. 1 in which the image output unit (30) is provided with a collimator and a side view of an optical device (100-1) for augmented reality in which an auxiliary reflective unit functioning as a collimator is disposed.
Figure 3:
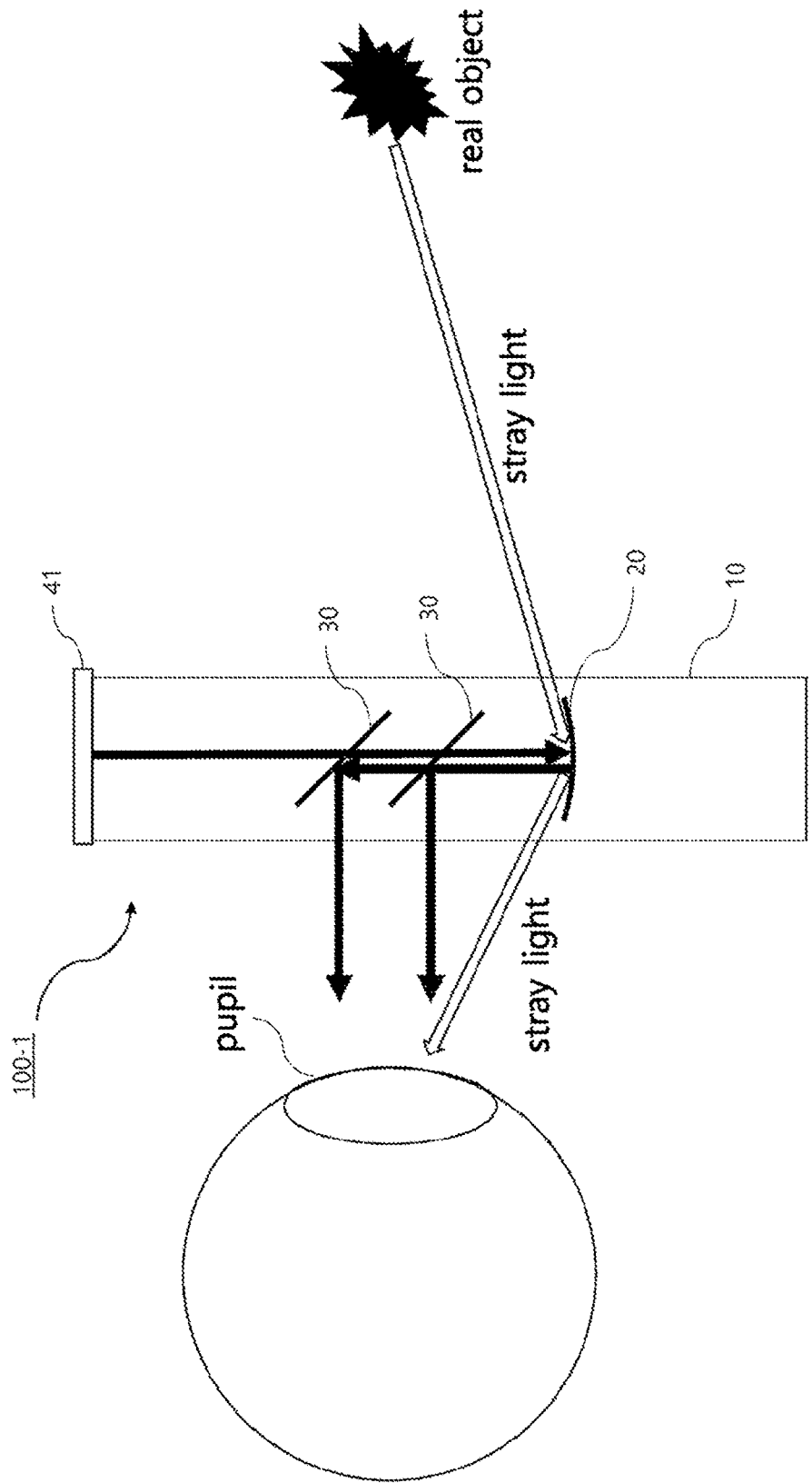
FIG. 3 is a diagram illustrating the principle by which a ghost image is generated in the optical device (100-1) for augmented reality.
Figure 4:
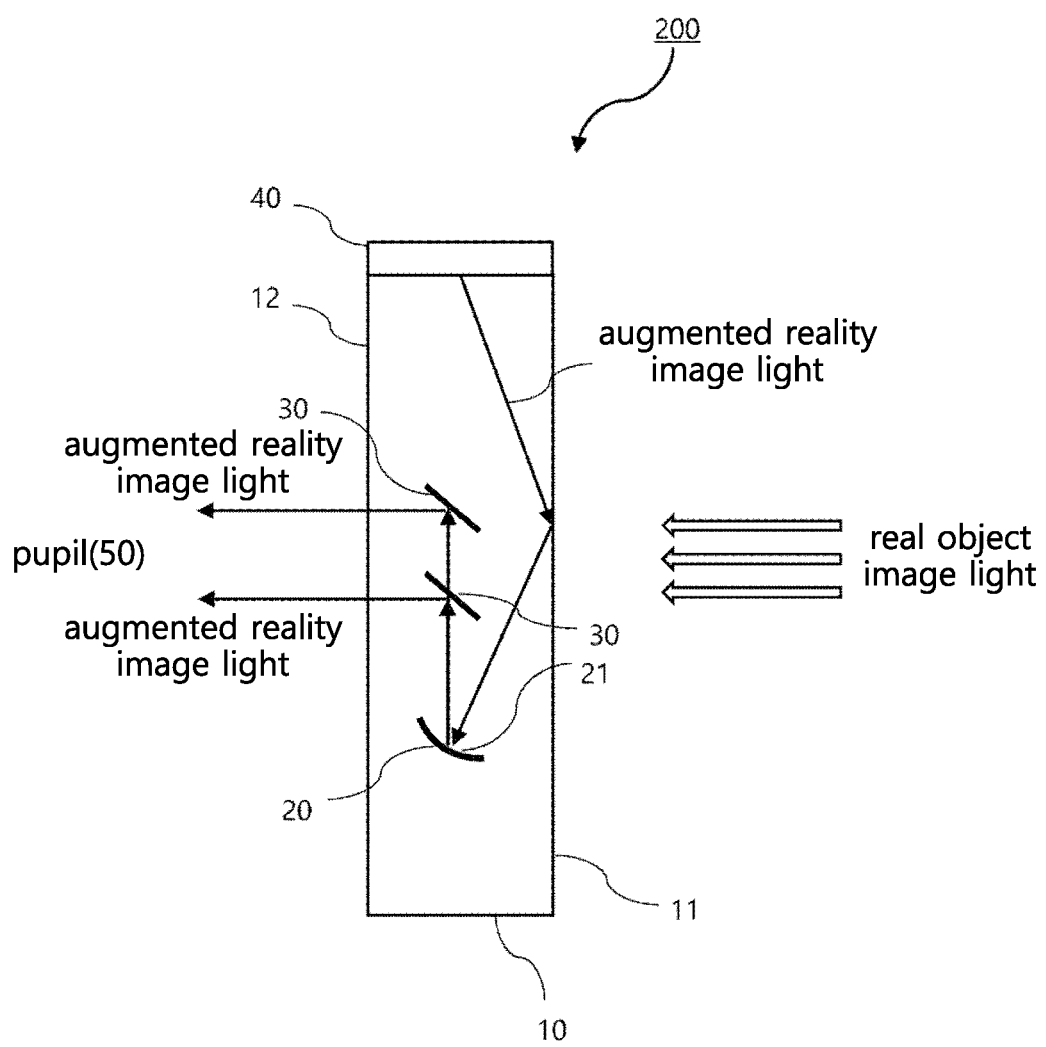
Figure 5:
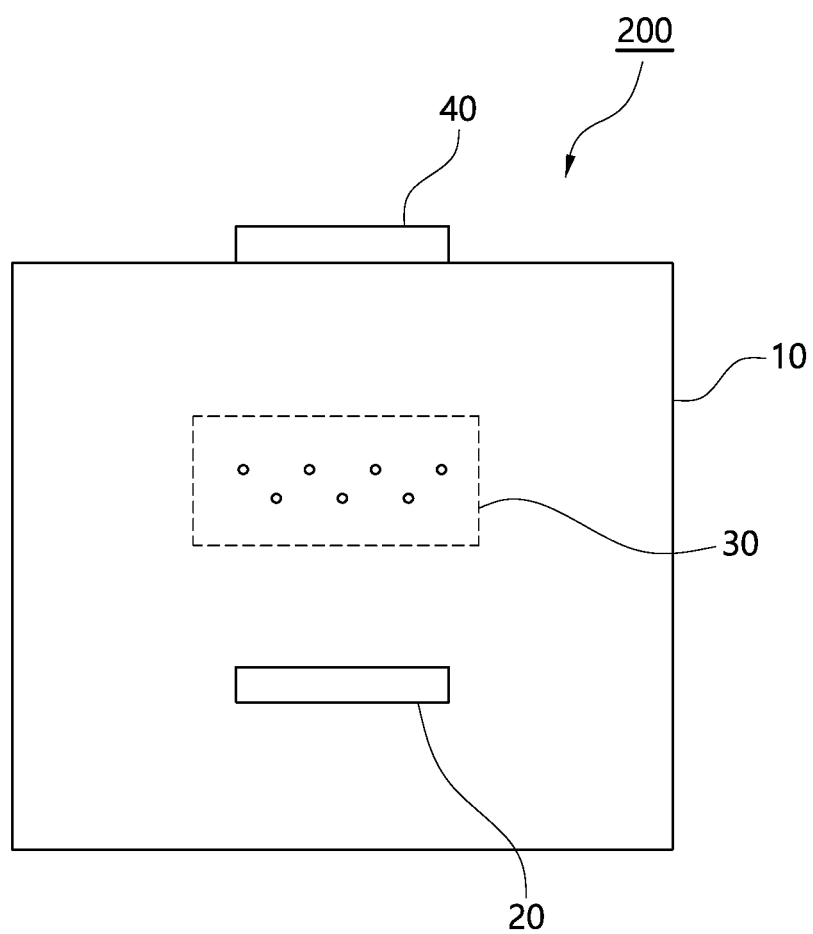
Figure 6:
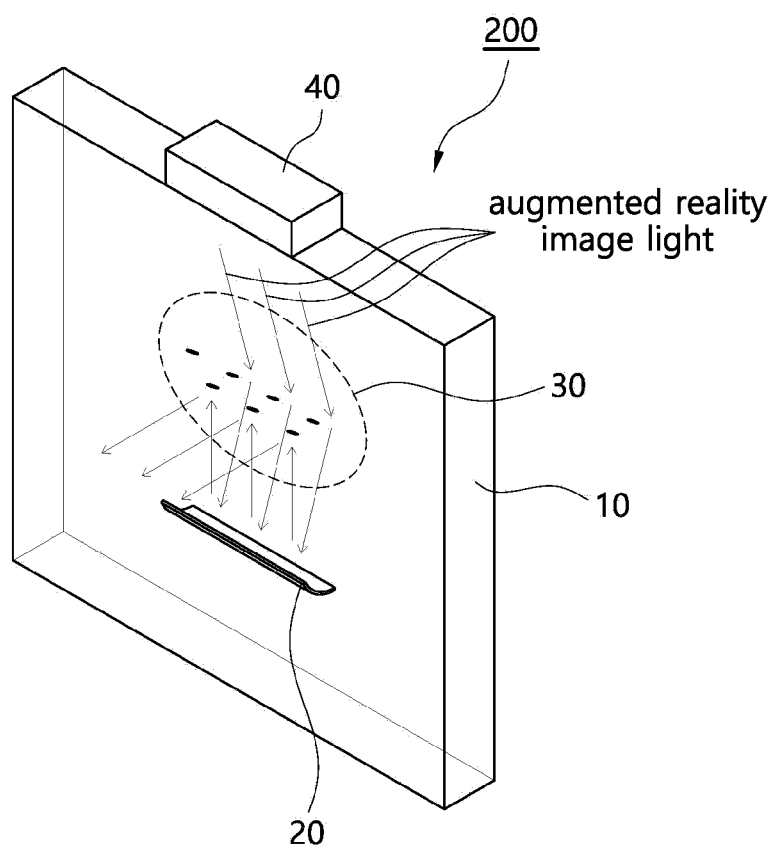

FIGS. 4 to 6 are diagrams illustrating the configuration of an optical device 200 for augmented reality having a ghost image blocking function (hereinafter simply referred to as the "optical device 200 for augmented reality") according to an embodiment of the present invention, wherein FIG. 4 is a side view of the optical device 200 for augmented reality, FIG. 5 is a front view of the optical device 200 for augmented reality, and FIG. 6 is a perspective view of the optical device 200 for augmented reality.

Referring to FIGS. 4 to 6, the optical device 200 for augmented reality according to the present embodiment includes an optical means 10, a first reflective unit 20, and a second reflective unit 30.

The optical means 10 is a means for transmitting at least part of real object image light, which is the image light output from a real object, therethrough toward the pupil 50 of an eye of a user.

In this case, the fact that at least part of real object image light is transmitted toward the pupil 50 means that the light transmittance of the real object image light does not necessarily need to be 100%.

The optical means 10 has first and second surfaces 11 and 12 that are disposed to be opposite to each other. The first surface 11 is a surface which the real object image light enters, and the second surface 12 is a surface through which the augmented reality image light reflected by the second reflective unit 30 and the real object image light passed through the first surface 11 are output toward the pupil 50 of the eye of the user.

The augmented reality image light output from the image output unit 40 may be transferred to the first reflective unit 20 through the inner part of the optical means 10, or may be reflected by total internal reflection on the inner surface of the optical means 10 and then transferred to the first reflective unit 20.

It should be noted that the embodiment of FIGS. 4 to 6 is intended to illustrate a total internal reflection structure in which the augmented reality image light output from the image output unit 40 is reflected by total internal reflection on the inner surface (the first surface 11) of the optical means 10 and then transferred to the first reflective unit 20.

When the total internal reflection structure is not used, i.e., when the augmented reality image light output from the image output unit 40 is transferred directly to the first reflective unit 20, there may be used a method in which the image output unit 40 may be disposed at an appropriate location (e.g., an appropriate location on the extension line of the arrow entering the first reflective unit 20 outside the optical means 10 in FIG. 4) by taking into consideration the angle of the first reflective unit 20.

When there is used the total internal reflection structure in which light is reflected by total internal reflection on the inner surface of the optical means 10, the augmented reality image light output from the image output unit 40 is reflected by total internal reflection on the first surface 11 of the optical means 10 and then transferred to the first reflective unit 20, and the augmented reality image light reflected by the first reflective unit 20 is reflected by the second reflective unit 30 and then output to the pupil 50 through the second surface 12, as shown in FIGS. 4 to 6.

In this case, the image output unit 40 is a means for outputting augmented reality image light. The image output unit 40 outputs augmented reality image light to the first reflective unit 20 or outputs augmented reality image light toward the first surface 11 of the optical means 10, as described above. The image output unit 40 may be, e.g., a small-sized display device such as a liquid crystal display (LCD). Since the image output unit 40 itself is not a direct target of the present invention and is known in prior art, a detailed description thereof will be omitted below. However, the image output unit 40 according to the present embodiment does not include a component such as a collimator described in the description of the related art.

Meanwhile, the image for augmented reality refers to a virtual image transferred to the pupil 50 of the user through the image output unit 40, the optical means 10, the first reflective unit 20, and the second reflective unit 30. The image for augmented reality may be a still or moving image in the form of an image.

The image for augmented reality is transferred to the pupil 50 of the user by the image output unit 40, the optical means 10, the first reflective unit 20, and the second reflective unit 30, thereby being provided to the user as a virtual image. At the same time, the user receives the real object image light output from a real object present in the real world through the optical means 10. Accordingly, the user may be provided with an augmented reality service.

The first reflective unit 20 is disposed inside the optical means 10, and is a means for transferring the augmented reality image light, output from the image output unit 40, to the second reflective unit 30.

As described above, the image output unit 40 outputs augmented reality image light toward the first reflective unit 20 or the first surface 11 of the optical means 10. When the total internal reflection structure is used, the augmented reality image light reflected by total internal reflection on the first surface 11 of the optical means 10 is transferred to the first reflective unit 20, and the augmented reality image light reflected by the first reflective unit 20 is transferred to the second reflective unit 30, reflected again by the second reflective unit 30, and then output toward the pupil 50. In the case where it is not the total internal reflection structure, the augmented reality image light output from the image output unit 40 is directly transferred to the first reflective unit 20, and the augmented reality image light reflected by the first reflective unit 20 is transferred to the second reflective unit 30, reflected again by the second reflective unit 30, and then output toward the pupil 50.

The first reflective unit 20 is disposed inside the optical means 10 while facing the image output unit 40 with the second reflective unit 30 interposed therebetween.

The first reflective unit 20 is disposed inside the optical means 10 while being opposite to the image output unit 40 with the second reflector 30 interposed therebetween and facing the first surface 11 of the optical means 10.

Furthermore, the first reflective unit 20 is disposed inside the optical means 10 between the first and second surfaces 11 and 12 so that it can reflect image light corresponding to an image for augmented reality toward the second reflective unit 30. In other words, the first reflective unit 20 is disposed inside the optical means 10 between the first and second surfaces 11 and 12 so that it can transfer the augmented reality image light output from the image output unit 40 or the augmented reality image light transferred by being reflected from the first surface 11 of the optical means 10 to the second reflective unit 30 by reflecting the light.

Furthermore, the first reflective unit 20 is disposed inside the optical means 10 so that the reflective surface 21 of the first reflective unit 20 reflecting augmented reality image light can face the direction in which the augmented reality image light enters. Furthermore, the reflective surface 21 of the first reflective unit 20 is disposed to face the first surface 11 of the optical means 10. With this configuration, the first reflective unit 20 may function to filter out stray light generating a ghost image in the real object image light output from a real object without being transferred to the second reflective unit 30.

Meanwhile, the reflective surface 21 of the first reflective unit 20 may be formed as a curved surface. For example, the reflective surface 21 of the first reflective unit 20 may be a concave mirror that is formed to be concave in the direction of the first surface 11 of the optical means 10, which is the direction in which augmented reality image light enters. In this case, the first reflective unit 20 may function as a collimator for collimating the augmented reality image light output from the image output unit 40. Accordingly, it is not necessary to use a component, such as a collimator, for the image output unit 40.

Figure 7:
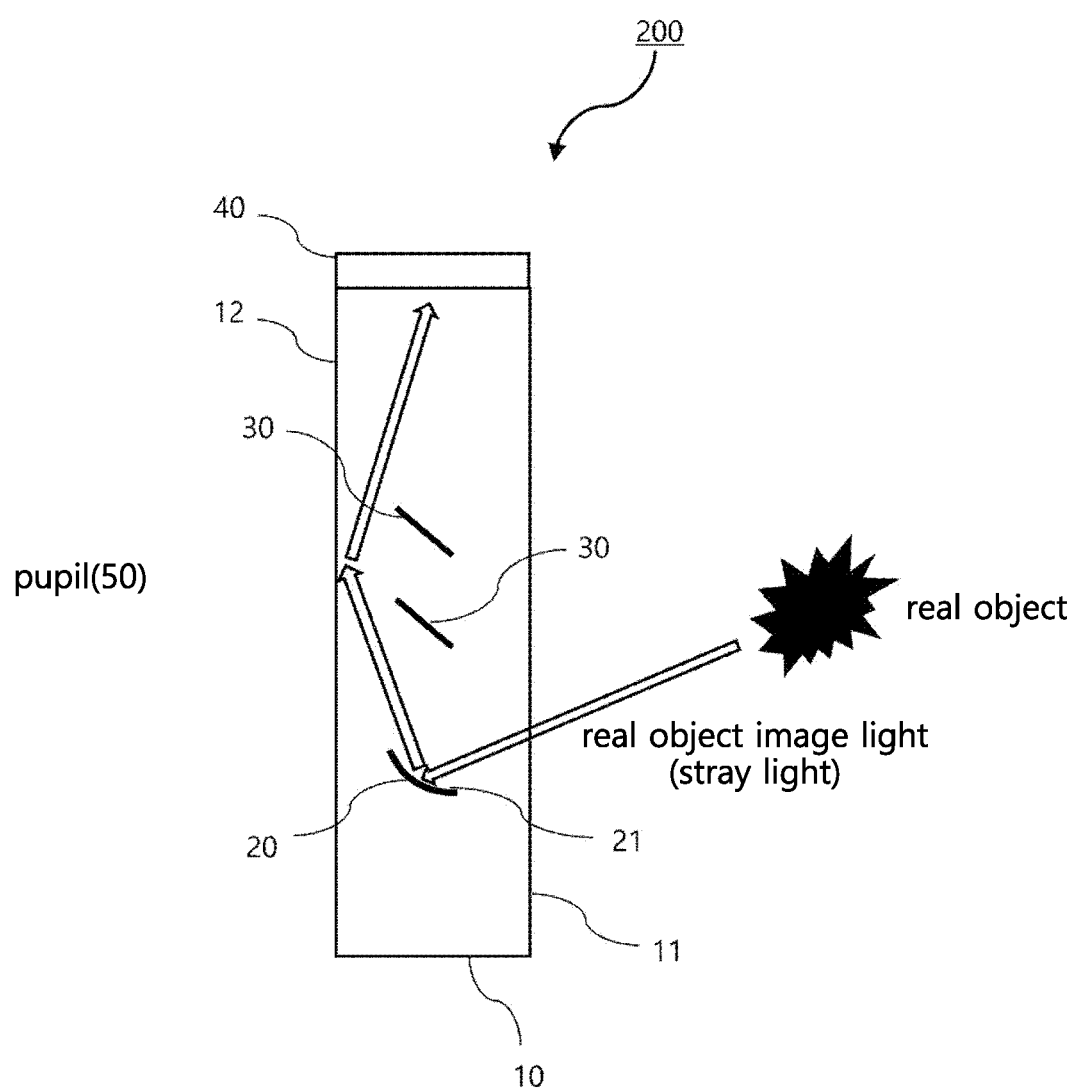
FIG. 7 is a diagram illustrating the principle by which the first reflective unit (20) blocks a ghost image.

FIG. 7 is a diagram illustrating the principle by which the first reflective unit 20 blocks a ghost image.

As shown in FIG. 7, the real object image light (stray light) that is output from a real object and may generate a ghost image enters the first reflective unit 20. As described above, the first reflective unit 20 is disposed to face the first surface 11 in the direction in which real object image light enters. Accordingly, it can be seen that the real object image light (stray light) reflected from the reflective surface 21 of the first reflective unit 20 is output toward the second surface 12 of the optical means 10, reflected by total internal reflection again on the second surface 12 of the optical means 10, and then transferred in the direction of the image output unit 40. As a result, it can be seen that the real object image light, which is stray light that is output from a real object and may generate a ghost image, is dissipated inside the optical means 10 and does not leak toward the pupil 50.

However, this is the basic principle for preventing the real object image light (stray light) reflected by the first reflective unit 20 from leaking out of the optical means 10. In practice, the location and direction of the first reflective unit 20 need to be appropriately adjusted to minimize external light (stray light) reflected by the first reflective unit 20 and entering the pupil 50 by taking into consideration the shape and refractive index of the optical means 10, the locations of the eye and the first reflective unit 20, the size of the pupil, and eye relief.

Meanwhile, as will be described later, the size of the second reflective unit 30 is formed to be 8 mm or less, which is the size of the average pupil of people, more preferably 4 mm or less. By taking into consideration this, the length of the first reflective unit 20 in the widthwise direction thereof is preferably formed to be 8 mm or less, more preferably 4 mm or less, in order to correspond to the size of the second reflective unit 30.

In this case, the widthwise direction of the first reflective unit 20 refers to the direction that extends between the first and second surfaces 11 and 12 of the optical means 10 in FIGS. 4 to 6.

Furthermore, it is preferable that the first reflective unit 20 have a significantly small thickness when viewed from a forward location in order to allow the user to rarely recognize the first reflective unit 20 through the pupil 50.

Furthermore, the first reflective unit 20 may be composed of a means such as a half mirror that partially reflects light.

Furthermore, the first reflective unit 20 may be formed of a refractive or diffractive element other than a reflective means.

Furthermore, the first reflective unit 20 may be formed of an optical element such as a notch filter that selectively transmits light according to its wavelength.

Furthermore, the surface of the first reflective unit 20 opposite to the surface thereof that reflects augmented reality image light may be coated with a material that absorbs light without reflecting it.

Meanwhile, in the embodiments of FIGS. 4 to 6, the first reflective unit 20 is shown in the shape of a bar extending in the form of a straight line as shown in FIG. 6, but this is exemplary. For example, when the first reflective unit 20 is viewed in the state in which the optical means 10 is placed in front of the pupil 50, both ends thereof are formed to be disposed above the central portion thereof, so that the first reflective unit 20 may be formed in a moderate "U" shape as a whole.

Referring again to FIGS. 4 to 6, the second reflective unit 30 will be described below.

The second reflective unit 30 is disposed inside the optical means 10, and is a means for transferring augmented reality image light, transferred from the first reflective unit 20, to the pupil 50 of the eye of the user by reflecting it toward the pupil 50, thereby providing an image for augmented reality to the user.

The second reflective unit 30 is disposed at an inclination angle with respect to the second surface 12 of the optical means 10 so that it can transfer the augmented reality image light, transferred from the first reflective unit 20, toward the pupil 50 by reflecting it toward the pupil 50.

The second reflective unit 30 is formed to be equal to or smaller than the size of the average pupil of people, i.e., 8 mm or less, more preferably 4 mm or less, in order to obtain a pinhole effect by increasing the depth of field, as described in the description of the related art.

In other words, the second reflective unit 30 is formed to be smaller than the size of the average pupil of people. By this, the depth of field for the light entering the pupil through the reflective unit 30 may be made almost infinite, i.e., considerably deep. Accordingly, there may be achieved a pinhole effect that allows an image for augmented reality to be always recognized as being in focus regardless of a change in the focal distance even when a user changes the focal distance for the real world while gazing at the real world.

In this case, the size of the second reflective unit 30 is defined as the maximum length between any two points on the edge boundary of the second reflective unit 30.

Furthermore, the size of the second reflective unit 30 may be the maximum length between any two points on the edge boundary of an orthographic projection obtained by projecting the second reflective unit 30 onto a plane that is perpendicular to a straight line between the pupil 50 and the second reflective unit 30 and includes the center of the pupil 50.

Meanwhile, when the size of the second reflective unit 30 is excessively small, a diffraction phenomenon may occur, and thus the second reflective unit 30 preferably has a size of 0.3 mm or more.

Meanwhile, the second reflective unit 30 may comprise a plurality of reflective units. In this case, each of the plurality of the second reflective units 30 are disposed such that image light corresponding to an image for augmented reality transferred from the first reflective unit 20 is not blocked by the other remaining second reflective units 30, as shown in FIGS. 5 and 6.

Even in this case, the size of each of the plurality of the second reflective units 30 is formed to be 8 mm or less, more preferably 4 mm or less.

Furthermore, the sizes of the plurality of the second reflective units 30 do not have to be all the same, and may be partially different from each other.

Furthermore, although it is preferable that the plurality of the second reflective units 30 be disposed at the same intervals, the interval between at least some of the plurality of the second reflective units 30 may be different from the interval between the other second reflective units 30.

Furthermore, at least some of the plurality of the second reflective units 30 may be composed of means such as half mirrors that partially reflect light.

Furthermore, at least some of the plurality of the second reflective units 30 may be formed of refractive elements or diffractive elements other than the reflective means.

Furthermore, at least some of the plurality of the second reflective units 30 may be composed of optical elements such as notch filters that selectively transmit light according to the wavelength.

Furthermore, the surface of each of at least some of the plurality of the second reflective units 30 opposite to the surface thereof that reflects augmented reality image light may be coated with a material that absorbs light without reflecting it.

Furthermore, the surfaces of at least some of the plurality of the second reflective units 30 may be formed as curved surfaces. In this case, the curved surfaces may be concave or convex surfaces.

Furthermore, the inclination angle of at least some of the plurality of the second reflective units 30 with respect to the optical means 10 may be formed to be different from the inclination angle of the other remaining second reflective units 30.

Figure 8:
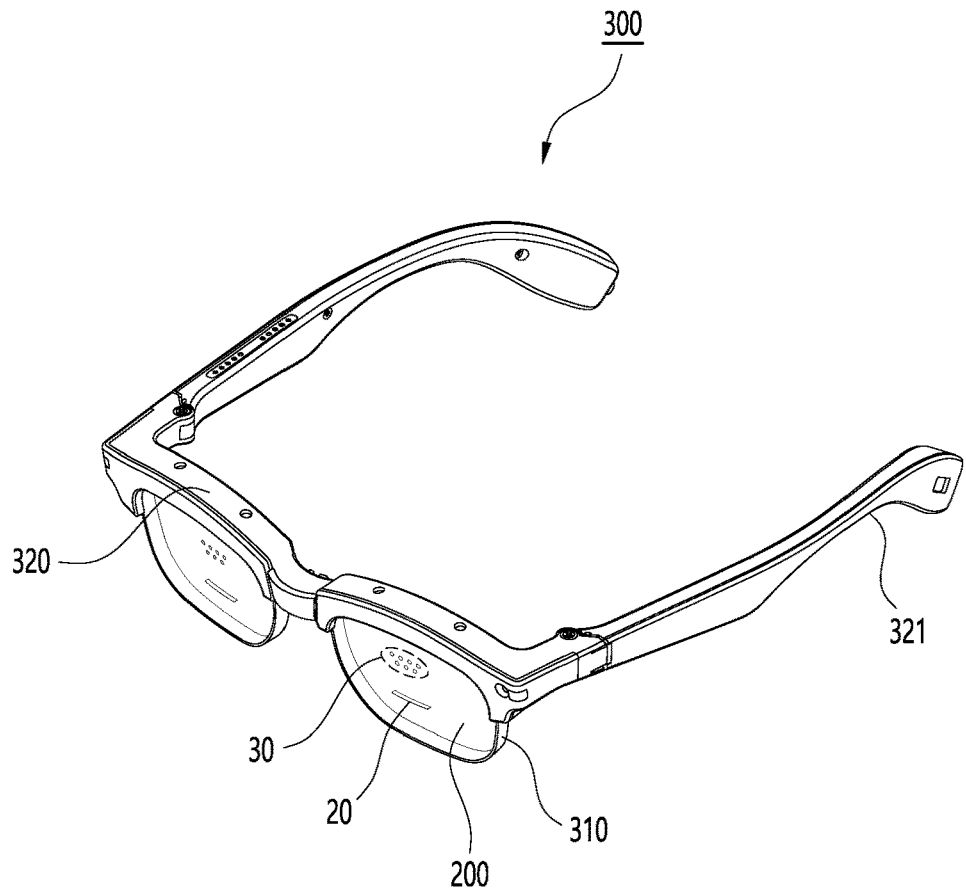
FIGS. 8 and 9 show an embodiment of an apparatus (300) for providing augmented reality that is implemented using the optical device (200) for augmented reality according to the present invention.
Figure 9:
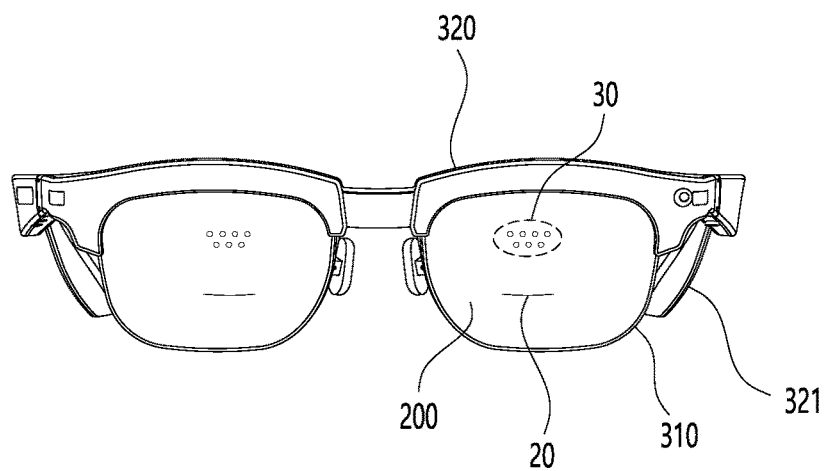

FIGS. 8 and 9 show an embodiment of an apparatus 300 for providing augmented reality in the form of glasses that is implemented using the optical device 200 for augmented reality according to the present invention described above.

As shown in FIGS. 8 and 9, the apparatus 300 for providing augmented reality is formed in the form of conventional glasses, including lens units 310 and a frame unit 320 configured to fix the lens units 310, as a whole, and is characterized in that the lens units 310 are implemented as the optical device 200 for augmented reality described above.

In this case, the lens unit 310 corresponds to the optical means 10 of the optical device 200 for augmented reality described above, and the first reflective unit 20 and the second reflective unit 30 are disposed inside the lens unit 310 in the same manner as described above.

The frame unit 320 may be configured in the form of conventionally known glasses that surround the peripheries of the lens units 310, and the image output unit 40 may be disposed at an appropriate location of the frame unit 320 as described above. In this case, for example, a connection port configured to enable connection to a smartphone or computer in a wired or wireless manner may be formed at the end of a leg portion 321 of the frame unit 320 that allows the apparatus 300 for providing augmented reality to be worn on a user's ear, image or video data corresponding to an image for augmented reality may be transmitted to the image output unit 40 through a cable formed inside the connection port and the frame unit 320, and thus the image output unit 40 may be configured to output image light corresponding to an image for augmented reality.

As described above, according to the optical device 200 for augmented reality according to the present invention, it may be possible to significantly reduce the overall size, thickness, and volume of the device while minimizing the occurrence of a ghost image, so that the apparatus 300 for providing augmented reality may also have these advantages without change. Accordingly, it may be possible to provide the apparatus 300 for providing augmented reality having excellent fit without requiring a complicated configuration compared to the prior art.

Meanwhile, in the apparatus 300 for providing augmented reality shown in FIGS. 8 and 9, for a user having refractive error, a vision correction lens having a predetermined refractive power may be disposed on at least one of the outer and inner sides of the lens unit 310, or all or part of the lens unit 310 (the optical means 10) itself may be formed as a vision correction lens having a predetermined refractive power. According to this configuration, there is an advantage in that it may be possible to additionally provide a vision correction effect according to a user's vision.

Although the present invention has been described with reference to the preferred embodiments of the present invention above, it is obvious that the present invention is not limited to the above-described embodiments and other various modifications and alterations may be possible.

For example, although the case using a total internal reflection structure has been described with reference to the drawings in the embodiments of FIGS. 4 to 6 above, it is obvious that augmented reality image light may be transferred from the image output unit 40 to the first reflective unit 20 without total internal reflection by appropriately disposing the image output unit 40.

The invention claimed is:

1. An optical device for augmented reality having a ghost image blocking function, the optical device comprising:
   an optical means configured to transmit at least part of real object image light, which is image light output from a real object, therethrough toward a pupil of an eye of a user;
   a first reflective unit disposed inside the optical means, and configured to transfer augmented reality image light, which is image light corresponding to an image for augmented reality output from an image output unit, to a second reflective unit; and
   the second reflective unit disposed inside the optical means, and configured to transfer the augmented reality image light, transferred from the first reflective unit, to the pupil of the eye of the user by reflecting the augmented reality image light to the pupil of the eye of the user, thereby providing the image for augmented reality to the user;
   wherein the optical means has a first surface which the real object image light enters, and a second surface through which the augmented reality image light, transferred via the second reflective unit, and the real object image light are output toward the pupil of the eye of the user;
   wherein the augmented reality image light output from the image output unit is transferred to the first reflective unit through an inner part of the optical means, or is reflected by total internal reflection on an inner surface of the optical means and transferred to the first reflective unit; and
   wherein a reflective surface of the first reflective unit which reflects the augmented reality image light is disposed to face a direction in which the augmented real image light enters.

2. The optical device of claim 1, wherein the first reflective unit is disposed inside the optical means to be opposite to the image output unit with the second reflective unit interposed therebetween and to face the first surface of the optical means.

3. The optical device of claim 1, wherein the reflective surface of the first reflective unit is formed as a curved surface.

4. The optical device of claim 3, wherein the reflective surface of the first reflective unit is formed to be concave toward the direction in which the augmented real image light enters.

5. The optical device of claim 1, wherein a length of the first reflective unit in a widthwise direction thereof is 4 mm or less.

6. The optical device of claim 1, wherein the first reflective unit is formed of a half mirror configured to partially reflect light or a notch filter configured to selectively transmit light according to a wavelength of the light.

7. The optical device of claim 1, wherein the first reflective unit is formed of a refractive or diffractive element.

8. The optical device of claim 1, wherein a surface of the first reflective unit opposite to a surface thereof that reflects the augmented reality image light is coated with a material that absorbs light without reflecting light.

9. The optical device of claim 1, wherein the second reflective unit is disposed to have an inclination angle with respect to the second surface of the optical means in order to transfer the augmented reality image light, transferred from the first reflective unit, to the pupil by reflecting the augmented reality image light toward the pupil.

10. The optical device of claim 9, wherein the second reflective unit is formed to have a size of 4 mm or less.

11. The optical device of claim 10, wherein the size of the second reflective unit is a maximum length between any two points on an edge boundary of the second reflective unit.

12. The optical device of claim 10, wherein the size of the second reflective unit is a maximum length between any two points on an edge boundary of an orthographic projection obtained by projecting the second reflective unit onto a plane including a center of the pupil while being perpendicular to a straight line between the pupil of the user and the second reflective unit.

13. The optical device of claim 10, wherein the second reflective unit comprises a plurality of the second reflective units, and each of the plurality of second reflective units is disposed such that the augmented reality image light transferred from the first reflective unit is not blocked by others of the plurality of second reflective units.

14. The optical device of claim 13, wherein sizes of the plurality of the second reflective units are partially different from each other.

15. The optical device of claim 13, wherein at least some of the plurality of the second reflective units are each formed of a half mirror configured to partially reflect light or a notch filter configured to selectively transmit light according to a wavelength of the light.

16. The optical device of claim 13, wherein at least some of the plurality of the second reflective units are each formed of a refractive or diffractive element.

17. The optical device of claim 13, wherein for at least some of the plurality of the second reflective units, a surface thereof opposite to a surface thereof that reflects the augmented reality image light is coated with a material that absorbs light without reflecting light.

18. The optical device of claim 13, wherein surfaces of at least some of the plurality of the second reflective units are formed as curved surfaces.

19. The optical device of claim 10, wherein the second reflective unit comprises a plurality of the second reflective units, and wherein an interval between at least some of the plurality of the second reflective units is different from an interval between others of the plurality of second reflective units.

20. The optical device of claim 10, wherein the second reflective unit comprises a plurality of the second reflective units, and wherein an inclination angle of at least some of the plurality of the second reflective units with respect to the optical means is formed to be different from an inclination angle of others of the plurality of second reflective units.

21. An apparatus for providing augmented reality in a form of glasses, the apparatus comprising lens units configured to transmit at least part of image light output from a real object therethrough toward a pupil of an eye of a user and a frame unit configured to fix the lens units, wherein each of the lens units is the optical device of claim 1.

22. The apparatus of claim 21, wherein a lens having a refractive power for vision correction is disposed on at least one of outer and inner sides of the lens units.

23. The apparatus of claim 21, wherein all or part of the lens unit is formed of a vision correction lens having a refractive power for vision correction.

* * * * *